US010978799B2

(12) United States Patent
Wu et al.

(10) Patent No.: US 10,978,799 B2
(45) Date of Patent: Apr. 13, 2021

(54) DIRECTIONAL ANTENNA TRACKING METHOD AND COMMUNICATION DEVICE

(71) Applicant: SZ DJI TECHNOLOGY CO., LTD., Shenzhen (CN)

(72) Inventors: Jun Wu, Shenzhen (CN); Ming Gong, Shenzhen (CN); Han Huang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 47 days.

(21) Appl. No.: 16/428,175

(22) Filed: May 31, 2019

(65) Prior Publication Data
US 2019/0288387 A1 Sep. 19, 2019

Related U.S. Application Data

(63) Continuation of application No. PCT/CN2016/108195, filed on Dec. 1, 2016.

(51) Int. Cl.
*H01Q 3/08* (2006.01)
*H01Q 3/02* (2006.01)
*H04W 76/10* (2018.01)
*H01Q 1/28* (2006.01)
*H01Q 3/00* (2006.01)

(52) U.S. Cl.
CPC ............. *H01Q 3/08* (2013.01); *H01Q 1/285* (2013.01); *H01Q 3/00* (2013.01); *H01Q 3/02* (2013.01); *H04W 76/10* (2018.02)

(58) Field of Classification Search
CPC .. H01Q 3/00; H01Q 3/02; H01Q 3/08; H01Q 1/28; H01Q 1/285
See application file for complete search history.

(56) References Cited

U.S. PATENT DOCUMENTS

2012/0235863 A1* 9/2012 Erdos ................ H01Q 3/00
  342/359
2016/0065286 A1* 3/2016 Kim ................ H04B 7/0617
  370/330

FOREIGN PATENT DOCUMENTS

| CN | 202285045 U | 6/2012 |
| CN | 104808702 A | 7/2015 |
| CN | 104932548 A | 9/2015 |
| CN | 105119041 A | 12/2015 |
| CN | 105119650 A | 12/2015 |
| CN | 205069857 U | 3/2016 |

OTHER PUBLICATIONS

World Intellectual Property Organization (WIPO) International Search Report for PCT/CN2016/108195 dated Aug. 29, 2017 5 Pages.

\* cited by examiner

*Primary Examiner* — Hoang V Nguyen
(74) *Attorney, Agent, or Firm* — Anova Law Group, PLLC

(57) ABSTRACT

A directional antenna tracking method includes obtaining first motion feature information of a first device, receiving second motion feature information transmitted from a second device, calculating tracking information of a first directional antenna of the first device with respect to a second directional antenna of the second device based on the first motion feature information and the second motion feature information, and controlling the first directional antenna to move according to the tracking information to face toward the second directional antenna.

20 Claims, 10 Drawing Sheets

DIRECTIONAL ANTENNA TRACKING METHOD AND COMMUNICATION DEVICE

CROSS-REFERENCE TO RELATED APPLICATION

This application is a continuation of International Application No. PCT/CN2016/108195, filed on Dec. 1, 2016, the entire content of which is incorporated herein by reference.

TECHNICAL FIELD

The present disclosure relates to wireless communication technology and, more particularly, to a directional antenna tracking method and a communication device.

BACKGROUND

In a wireless communication system, an antenna system is an interface with external transmission media. In a typical point-to-point wireless communication system, such as between two unmanned aerial vehicles or between an unmanned aerial vehicle and a remote controller, both parties of communication are configured with antennas. Because both parties of communication may be moving in real-time, a distance between both parties and an attitude of each party may change. To ensure uninterrupted communication in this changing process, both parties of communication often use omni-directional antennas to communicate, thereby increasing a coverage range of communication.

In the related art, although the omni-directional antennas ensure a party of communication to receive signals from the other party of communication in any direction within the antenna coverage range, the structure of the omni-directional antenna does not concentrate communication signals in transmitting and receiving, and hence affects the communication distance and communication quality between both parties of communication.

SUMMARY

In accordance with the disclosure, there is provided a directional antenna tracking method including obtaining first motion feature information of a first device, receiving second motion feature information transmitted from a second device, calculating tracking information of a first directional antenna of the first device with respect to a second directional antenna of the second device based on the first motion feature information and the second motion feature information, and controlling the first directional antenna to move according to the tracking information to face toward the second directional antenna.

Also in accordance with the disclosure, there is provided a communication device including a first directional antenna and a device main body. The device main body includes a collection circuit configured to collect first motion feature information of the communication device, an interface configured to receive second motion feature information from a remote device, and a processor configured to calculate tracking information of the first directional antenna with respect to a second directional antenna of the remote device based on the first motion feature information and the second motion feature information, and control the first directional antenna to move according to the tracking information to face toward the second directional antenna.

BRIEF DESCRIPTION OF THE DRAWINGS

To more clearly illustrate the technical solutions of the present disclosure, the accompanying drawings to be used in the description of the disclosed embodiments are briefly described hereinafter. The drawings in the following descriptions are merely certain embodiments of the present disclosure. For those of ordinary skill in the art, other drawings may also be obtained according to these drawings without creative effort.

DETAILED DESCRIPTION OF THE EMBODIMENTS

Hereinafter, embodiments consistent with the present disclosure will be described with reference to drawings. The embodiments described are only some but not all of the embodiments. Based on the disclosed embodiments and without creative efforts, those having ordinary skill in the art may obtain other embodiments without departing from the scope of the present disclosure. Further, under the circumstances of no contradiction, the embodiments and the features of the embodiments may be combined.

Figure 1:
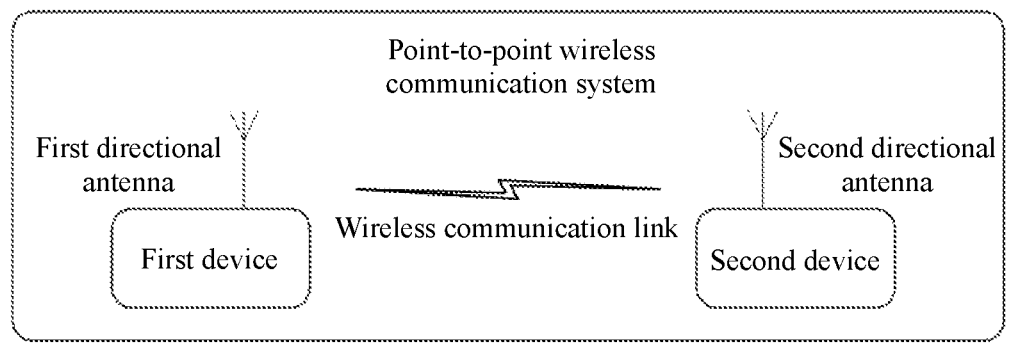
FIG. 1 is a schematic diagram of an example application scene of a point-to-point wireless communication system according to some embodiments of the present disclosure.

The embodiments of the present disclosure are applied to point-to-point wireless communication systems. Two parties of communication in a point-to-point communication may wirelessly communicate across a long distance. FIG. 1 is a schematic diagram of an example application scene of a point-to-point wireless communication system according to some embodiments of the present disclosure.

In the point-to-point wireless communication system shown in FIG. 1, two parties of the point-to-point communication are referred to as a first device and a second device, respectively. The first device and the second device are a near-end communication terminal and a far-end communication terminal with respect to each other. A wireless communication link is established between the two parties of the point-to-point communication to wirelessly communicate with each other through directional antennas. The directional antenna disposed at the first device is referred to as a first directional antenna. The directional antenna disposed at the second device is referred to as a second directional antenna. In some embodiments, the two communication parties may be two unmanned aerial vehicles, an unmanned aerial vehicle and a remote controller, two aircrafts, or two ships, etc.

The embodiments of the present disclosure are described below in detail with reference to the application scene shown in FIG. 1.

Figure 2A:
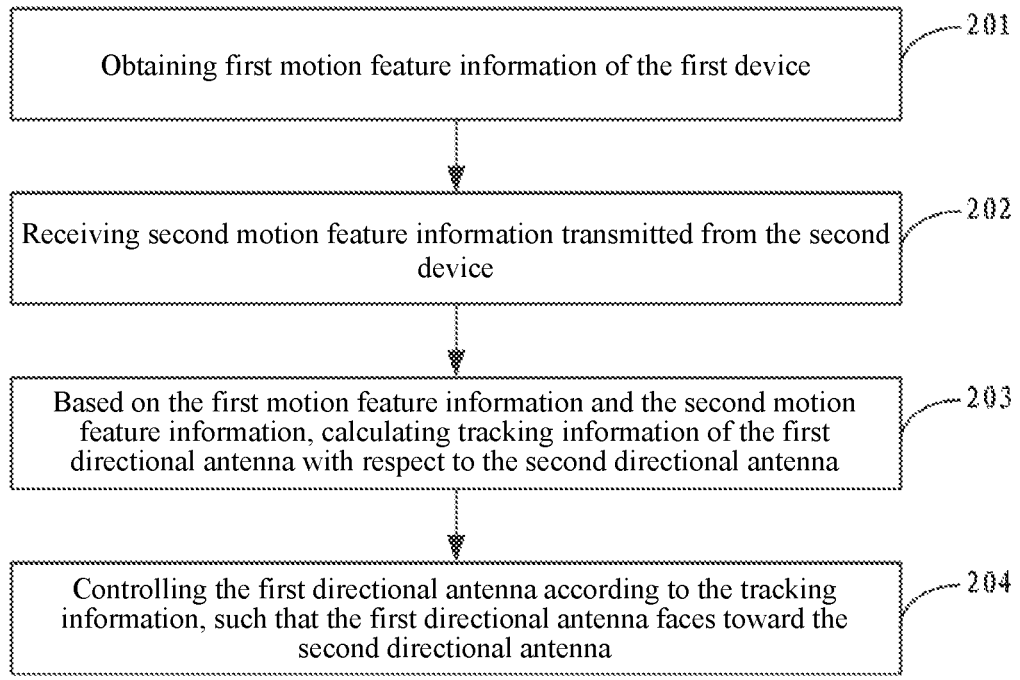
FIG. 2A is a flow chart of an example directional antenna tracking method according to some embodiments of the present disclosure.

FIG. 2A is a flow chart of an example directional antenna tracking method according to some embodiments of the present disclosure. The method is applied to the first device. The method illustrates a process of calculating tracking information of the first directional antenna by the first device. The method includes the following processes.

201: first motion feature information of the first device is obtained.

202: second motion feature information is received from the second device.

In some embodiments, during the communication process, the first device and the second device may be moving in real-time. That is, the spatial locations and the motion states of the devices are changing. Correspondingly, the spatial locations of the directional antennas disposed at the devices are changing consistent with the spatial locations of the devices. However, the motion states of the directional antennas may also change. For example, the directional antennas may rotate. The spatial location can be represented by spatial coordinate information, and the motion state can be represented by angle information.

In some embodiments, the coordinate information of the device and the directional antenna, the attitude information of the device, and the attitude information of the directional antenna are referred to as device motion feature information. To obtain the device motion feature information, the device can include a motion feature information collection circuit. The circuit may include an inertial measurement unit (IMU), a compass circuit, a global positioning (GPS) circuit, a base station based positioning circuit, and/or a vision and map based positioning circuit.

In some embodiments, the device main body includes the GPS circuit configured to collect the coordinate information of the device and the directional antenna. An IMU can be arranged at the device main body to collect the attitude information of the device. An IMU can be arranged at the directional antenna to collect the attitude information of the directional antenna.

The first device and the second device are the near-end communication terminal and the far-end communication terminal with respect to each other. Both include the motion feature information collection circuit. For the convenience of illustration, the first device includes first motion feature information collection circuit, and the second device includes second motion feature information collection circuit. The first motion feature information collection circuit collects first motion feature information. The second motion feature information collection circuit collects second motion feature information, and transmits the second motion feature information to the first device.

203: based on the first motion feature information and the second motion feature information, tracking information of the first directional antenna with respect to the second directional antenna is calculated.

In some embodiments, the first device calculates the tracking information of the first directional antenna with respect to the second directional antenna. The first motion feature information includes the coordinate information of the first device, the attitude information of the first device, and the attitude information of the first directional antenna. The second motion feature information includes the coordinate information of the second device.

When the first device calculates the tracking information of the first directional antenna with respect to the second directional antenna based on the first motion feature information and the second motion feature information, the first device calculates location information in a vertical direction and location information in a horizontal direction for the first device and the second device, respectively, based on the coordinate information of the first device and the coordinate information of the second device. A pre-configured trigonometric function such as a sine function, a cosine function, or a tangent function is used to calculate a target pitch angle of the first directional antenna with respect to the second directional antenna in the vertical direction and a target yaw angle of the first directional antenna with respect to the second directional antenna in the horizontal direction, respectively, based on the location information in the vertical direction and the location information in the horizontal direction. An adjustment pitch angle of the first directional antenna with respect to the second directional antenna and an adjustment yaw angle of the first directional antenna with respect to the second directional antenna are determined respectively, based on the attitude information of the first device and/or the attitude information of the first directional antenna, the target pitch angle, and the target yaw angle.

204: based on the tracking information, the first directional antenna is controlled to face toward the second directional antenna.

In some embodiments, when the first directional antenna is disposed at a multi-axis mechanical gimbal of the first device, the first device controls a vertical adjustment servo mechanism to drive the first directional antenna to move according to the adjustment pitch angle and controls a horizontal adjustment servo mechanism to drive the first directional antenna to move according to the adjustment yaw angle. Thus, the first directional antenna is controlled to face the second directional antenna.

In some embodiments, when the first directional antenna is an antenna array and the second directional antenna is an antenna array, a first target antenna is selected from the antenna array of the first directional antenna based on the adjustment pitch angle and the adjustment yaw angle to control the first directional antenna to face toward a second target antenna, where the second target antenna is a target antenna selected from the antenna array of the second directional antenna.

Figure 2B:
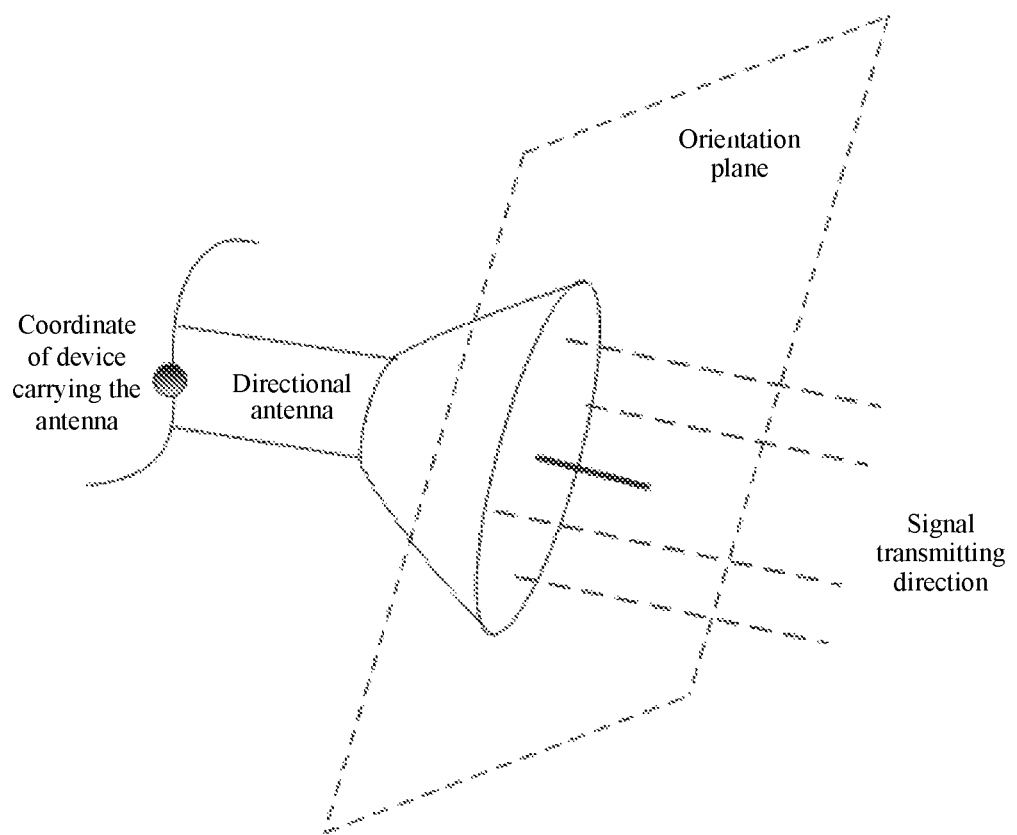
FIG. 2B is a schematic diagram of an example directional antenna according to some embodiments of the present disclosure.

In some embodiments, an orientation plane is defined for each directional antenna. The orientation plane can be perpendicular to a transmitting direction that the directional antenna transmits signals. The first directional antenna facing toward the second directional antenna refers to that the orientation plane of the first directional antenna is parallel to the orientation plane of the second directional antenna, and a line connecting between the coordinate of the first directional antenna and the coordinate of the second directional antenna is perpendicular to both orientation planes. The coordinate of the directional antenna can be the same as the coordinate of the device. FIG. 2B is a schematic diagram of an example directional antenna according to some embodiments of the present disclosure.

In the embodiments of the present disclosure, the tracking method is applied to the point-to-point communication system including the first device and the second device. The first device obtains the first motion feature information of itself, and receives the second motion feature information transmitted from the second device. Based on the first motion feature information and the second motion feature information, the tracking information of the first directional antenna with respect to the second directional antenna is calculated. The tracking information is used to control the first directional antenna, such that the orientation plane of the first directional antenna faces toward the orientation plane of the second directional antenna. Similarly, the second device performs the same directional antenna tracking process as the first device. In some embodiments, because both the first device and the second device include the directional antenna, both devices concentrate on each other to transmit and receive the communication signals. Because the directional antenna is automatically tracked in real-time based on the device motion feature information, the communication distance and the communication quality between both communication parties may be improved.

Figure 3:
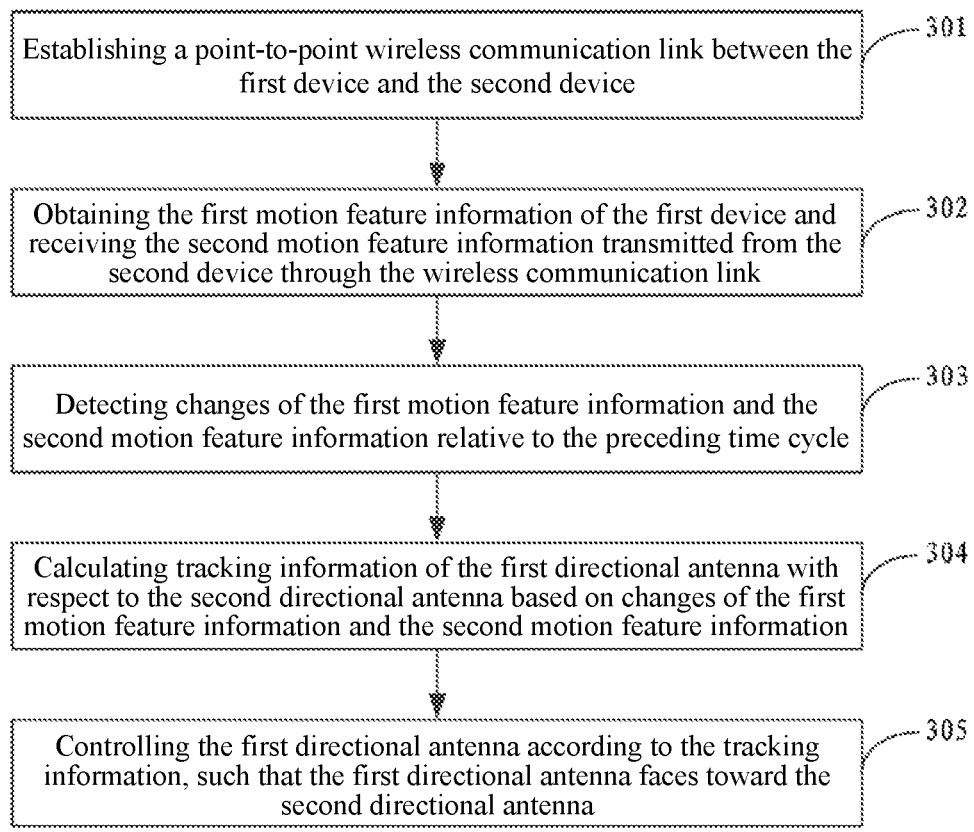
FIG. 3 is a flow chart of another example directional antenna tracking method according to some embodiments of the present disclosure.

FIG. 3 is a flow chart of another example directional antenna tracking method according to some embodiments of the present disclosure. The tracking method is applied to the first device. As shown in FIG. 3, the process that the first device calculates the tracking information of the first directional antenna based on the changes of the motion feature information includes the following.

301: a wireless communication link is established between the first device and the second device.

In some embodiments, the point-to-point communication parties include the first device and the second device. A direct wireless communication link is established between the first device and the second device. For example, when the first device and the second device are close to each other, the wireless communication link may be a Bluetooth communication link. The wireless communication link may include a third party relaying wireless signals between the first device and the second device. For example, when the first device and the second device are far away from each other, one or more access points (AP) may be used in between to establish the wireless communication link.

302: the first motion feature information of the first device is obtained, and the second motion feature information transmitted from the second device is received through the wireless communication link.

For implementation of process 302, reference may be made to the description above of processes 201 and 202, and detailed description thereof is not repeated herein.

303: the changes of the first motion feature information and the second motion feature information relative to those in the preceding time cycle is detected.

In some embodiments, during the process of communication, the spatial location and the motion state of the first device and the second device are dynamically changing. However, within a relatively short period of time, the spatial location and the motion state may not change dramatically or even may remain unchanged. Thus, a time cycle, e.g., 3 seconds, may be pre-determined. The first device and the second device may collect the respective motion feature information at the pre-determined time interval, and transmit to the other party.

Correspondingly, in the current time cycle, the first device can detect the change of the motion feature information relative to that in the preceding time cycle. That is, whether the first motion feature information and the second motion feature information change between the current time cycle and the preceding time cycle is determined. When it is determined that there is no change, the location and attitude of the directional antennas of the first device and the second device have not changed, and process 304 is not executed. Thus, the computing resource of the first device may be saved. When it is determined that there is a change, at least one of the location or the attitude of the directional antennas of the first device and the second device has changed, and the subsequent step 304 may be executed.

304: tracking information of the first directional antenna with respect to the second directional antenna is calculated based on the changes of the first motion feature information and the second motion feature information.

305: the tracking information is used to control the first directional antenna to face toward the second directional antenna.

For the implementation of processes 304 and 305, reference can be made to the description of processes 203 and 204, and the detailed description thereof is not repeated herein.

In the embodiment of the present disclosure, because the first device and the second device include directional antenna, both parties may concentrate on each other to transmit and receive signals. Moreover, because the directional antennas are automatically tracked in real-time based on the device motion feature information, the communication distance and the communication quality between both communication parties may be improved. In addition, because the first device only calculates the tracking information of the first directional antenna with respect to the second directional antenna when the first device detects a change of the motion feature information, the computing resource of the first device may be substantially saved.

Figure 4A:
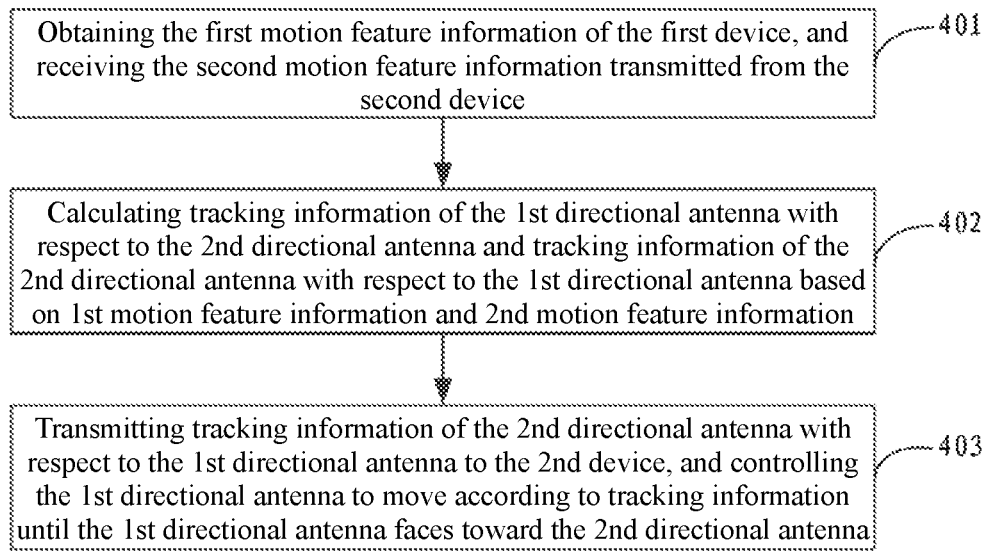
FIG. 4A is a flow chart of another example directional antenna tracking method according to some embodiments of the present disclosure.

FIG. 4A is a flow chart of another example directional antenna tracking method according to some embodiments of the present disclosure. The tracking method is applied to the first device. As shown in FIG. 4A, the process that the first device calculates the tracking information of the first directional antenna and the second directional antenna includes the following.

401: the first motion feature information of the first device is obtained, and the second motion feature information sent by the second device is received.

In some embodiments, the first motion feature information of the first device obtained by itself includes coordinate information of the first device, attitude information of the first device, and attitude information of the first directional antenna. The second motion feature information that the first device receives from the second device includes coordinate information of the second device, attitude information of the second device, and attitude information of the second directional antenna.

402: the tracking information of the first directional antenna with respect to the second directional antenna and the tracking information of the second directional antenna with respect to the first directional antenna are calculated based on the first motion feature information and the second motion feature information.

In some embodiments, when the first device calculates the tracking information of the first directional antenna and the second directional antenna, the first device calculates the location information in the vertical direction and the location information in the horizontal direction for the first device and the second device based on the coordinate information of the first device and the coordinate information of the second device. A pre-configured trigonometric function, such as a sine function, a cosine function, or a tangent function, can be used to calculate a target pitch angle of the first directional antenna with respect to the second directional antenna in the vertical direction and a target yaw angle of the first directional antenna with respect to the second directional antenna in the horizontal direction, respectively, based on the location information in the vertical direction and the location information in the horizontal direction. The pre-configured trigonometric function can also be used to calculate a target pitch angle of the second directional antenna with respect to the first directional antenna in the vertical direction and a target yaw angle of the second directional antenna with respect to the first directional antenna in the horizontal direction, respectively. An adjustment pitch angle of the first directional antenna with respect to the second directional antenna and an adjustment yaw angle of the first directional antenna with respect to the second directional antenna are determined respectively, based on the attitude information of the first device and/or the attitude information of the first directional antenna, and the target pitch angle and the target yaw angle of the first directional antenna. Similarly, an adjustment pitch angle of the second directional antenna with respect to the first directional antenna and an adjustment yaw angle of the second directional antenna with respect to the first directional antenna are determined respectively, based on the attitude information of the second device and/or the attitude information of the second directional antenna, and the target pitch angle and the target yaw angle of the second directional antenna.

403: the first device transmits the tracking information of the second directional antenna with respect to the first directional antenna to the second device, and controls the first directional antenna based on the tracking information of the first directional antenna with respect to the second directional antenna to turn the first directional antenna to face toward the second directional antenna.

For implementation of controlling the directional antennas of the first device and the second device, reference may be made to the description above of process 204, and detailed description thereof is not repeated herein.

Figure 4B:
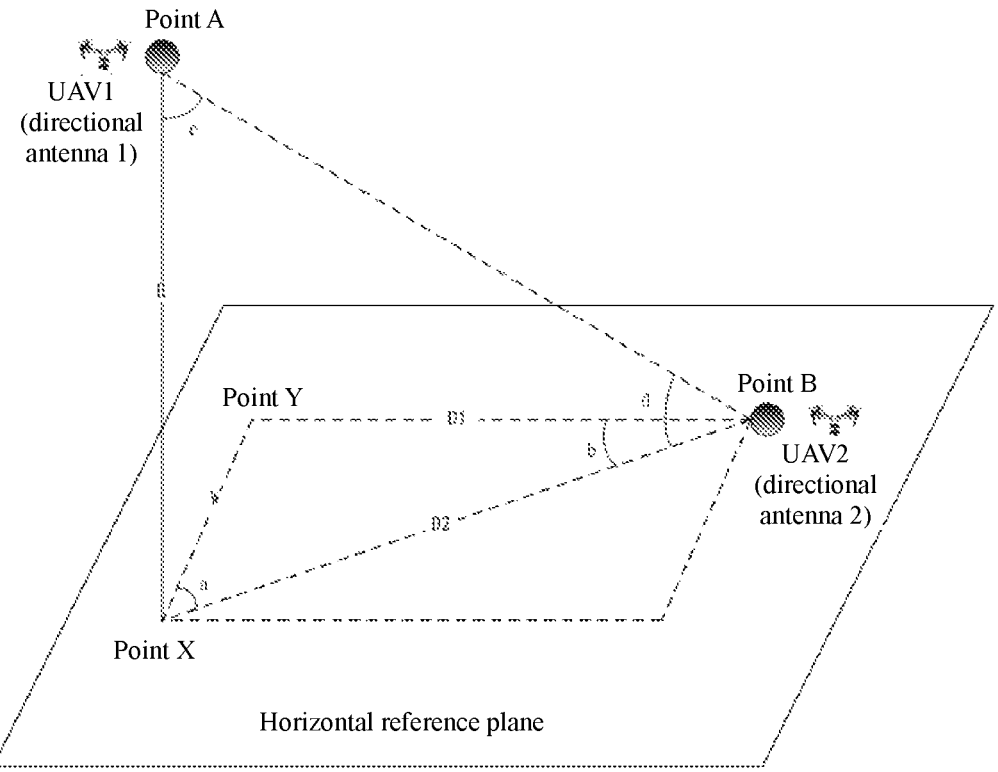
FIG. 4B is a three-dimensional schematic diagram of both parties of communication in an example point-to-point wireless communication system according to some embodiments of the present disclosure.

FIG. 4B is a three-dimensional schematic diagram of both parties of communication in an example point-to-point wireless communication system according to some embodiments of the present disclosure. The process of calculating the tracking information of the directional antenna is described below with reference to the FIG. 4B.

As shown in FIG. 4B, a point-to-point wireless communication link is established between an unmanned aerial vehicle 1 and an unmanned aerial vehicle 2. The coordinate of the unmanned aerial vehicle 1 is a point A, and the coordinate of the unmanned aerial vehicle 2 is a point B. The motion feature information obtained by the unmanned aerial vehicle 1 includes a spatial coordinate of the point A, an initial pitch angle $\alpha_{A1}$ and an initial yaw angle $\beta_{A1}$ of the unmanned aerial vehicle 1, and an initial pitch angle $\alpha_{A2}$ and an initial yaw angle $\beta_{A2}$ of a directional antenna 1. Further, the motion feature information received by the unmanned aerial vehicle 1 from the unmanned aerial vehicle 2 includes a spatial coordinate of the point B, an initial pitch angle $\alpha_{B1}$ and an initial yaw angle $\beta_{B1}$ of the unmanned aerial vehicle 2, and an initial pitch angle $\alpha_{B2}$ and an initial yaw angle $\beta_{B2}$ of a directional antenna 2. In some embodiments, each of the pitch angle and the yaw angle of the unmanned aerial vehicle refer to an angle between a direction to which the head of the unmanned aerial vehicle points and a reference direction, and each of the pitch angle and the yaw angle of the directional antenna refer to an angle between a direction to which the directional antenna transmits and a reference direction.

As shown in FIG. 4B, the spatial coordinate of the point B is used as the reference to establish a horizontal reference plane and a vertical reference plane (not shown in FIG. 4B) that are perpendicular to each other. The spatial coordinate of the point A and the spatial coordinate of the point B are used to calculate a distance H between the point A and the horizontal reference plane. The distance H corresponds to a point X on the horizontal reference plane. A distance between the point X and the point B is D2. An angle between the line H and the line D2 is a right angle. A distance from the point X to the vertical reference plane is W. The distance W corresponds to a point Y on the vertical reference plane. A distance between the point Y and the point B is D1. An angle between the line W and the line D1 is a right angle.

When calculating the tracking information, the unmanned aerial vehicle 1 calls a trigonometric function of a right-angle triangle to obtain an angle c and an angle d based on the distance H and the distance D2. The angle c is a target angle of the directional antenna 1 with respect to the directional antenna 2 in the vertical direction. The angle d is a target angle of the directional antenna 2 with respect to the directional antenna 1 in the vertical direction. Further, the distance W and the distance D1 are used to obtain an angle a and an angle b. The angle a is a target yaw angle of the directional antenna 1 with respect to the directional antenna 2 in the horizontal direction. The angle b is a target yaw angle of the directional antenna 2 with respect to the directional antenna 1 in the horizontal direction.

The unmanned aerial vehicle 1 determines the following angles based on the above described calculation.

The initial pitch angle $\alpha_{A1}$ of the unmanned aerial vehicle 1, an initial pitch angle $\alpha_{A2}$ of the directional antenna 1, and the calculated target pitch angle c are used to determine an adjustment pitch angle $\alpha_{A3}$ of the directional antenna 1 with respect to the directional antenna 2.

The initial yaw angle $\beta_{A1}$ of the unmanned aerial vehicle 1, an initial yaw angle $\beta_{A2}$ of the directional antenna 1, and the calculated target yaw angle a are used to determine an adjustment yaw angle $\beta_{A3}$ of the directional antenna 1 with respect to the directional antenna 2.

The initial pitch angle $\alpha_{B1}$ of the unmanned aerial vehicle 2, an initial pitch angle $\alpha_{B2}$ of the directional antenna 2, and the calculated target pitch angle d are used to determine an adjustment pitch angle $\alpha_{B3}$ of the directional antenna 2 with respect to the directional antenna 1.

The initial yaw angle $\beta_{B1}$ of the unmanned aerial vehicle 2, an initial yaw angle $\beta_{B2}$ of the directional antenna 2, and the calculated target yaw angle d are used to determine an adjustment yaw angle $\beta_{B3}$ of the directional antenna 2 with respect to the directional antenna 1.

Further, the unmanned aerial vehicle 1 controls the directional antenna 1 to move based on the adjustment pitch angle $\alpha_{A3}$ and the adjustment yaw angle $\beta_{A3}$. Similarly, the unmanned aerial vehicle 2 controls the directional antenna 2 to move based on the adjustment pitch angle $\alpha_{B3}$ and the adjustment yaw angle $\beta_{B3}$. As a result, the directional antenna 1 faces toward the directional antenna 2. That is, the directional antenna 2 faces toward the directional antenna 1.

The tracking method in FIG. 4A differs from the tracking method in FIG. 2A and FIG. 3 in that, when the computing ability of the first device is relatively strong, the first device may calculate the tracking information of the first directional antenna and the tracking information of the second directional antenna of the second device. Thus, the computing ability of the first device may be fully utilized and the computing resource of the second device may be saved.

Figure 5:
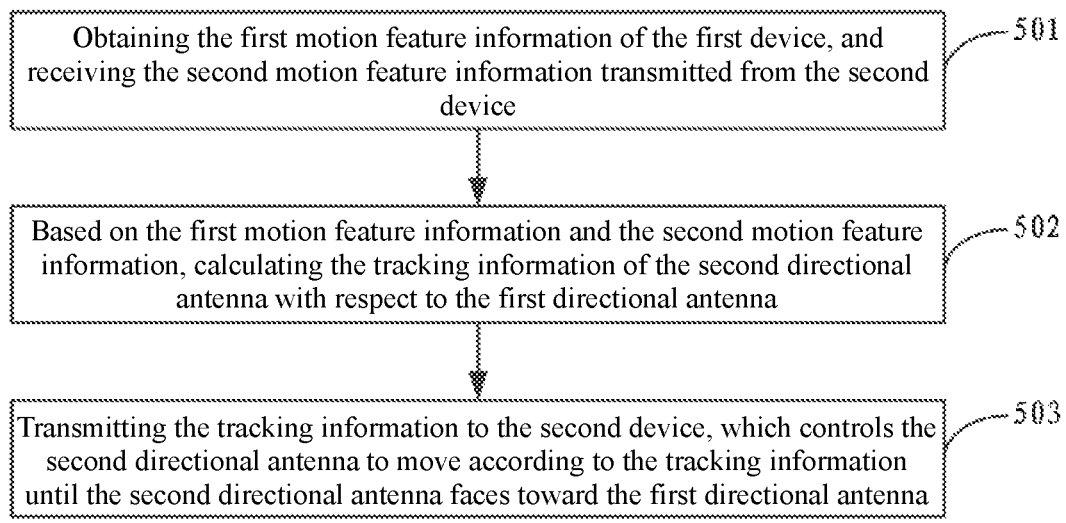
FIG. 5 is a flow chart of another example directional antenna tracking method according to some embodiments of the present disclosure.

FIG. 5 is a flow chart of another example directional antenna tracking method according to some embodiments of the present disclosure. The tracking method is applied to the first device. The process that the first device calculates the tracking information of the second directional antenna for the second device includes the following.

501: the first device obtains the first motion feature information of itself, and receives the second motion feature information transmitted from the second device.

In some embodiments, the first device includes a first motion feature information collection circuit, and uses the first motion feature information collection circuit to collect the first motion feature information of itself. Similarly, the second device includes a second motion feature information collection circuit, and uses the second motion feature information collection circuit to collect the second motion feature information of itself.

Each of the above-mentioned motion feature information collection circuits includes at least one of an inertial measurement unit (IMU), a compass circuit, a global positioning (GPS) circuit, a base station based positioning circuit, or a vision and map based positioning circuit.

A wireless communication link may be established in advance between the first device and the second device, and the wireless communication link may be used to exchange information between each other. The wireless communication link may include a direct wireless communication link, or an indirect wireless communication link having third party in between to relay wireless signals.

502: the first motion feature information and the second motion feature information are used to calculate the tracking information of the second directional antenna with respect to the first directional antenna.

In some embodiments, before the first device calculates the tracking information of the second directional antenna with respect to the first directional antenna, the first device determines whether the first motion feature information and the second motion feature information have changed relative to those in the preceding time cycle. When it is determined that there is a change, the calculation may be performed. When it is determined that there is no change, the calculation may be not performed.

In some embodiments, the first motion feature information may include the coordinate information of the first device. The second motion feature information may include the coordinate information of the second device, the attitude information of the second device, and the attitude information of the second directional antenna. For implementation of calculating the tracking information of the second directional antenna with respect to the first directional antenna by the first device, reference may be may be made to the description of process 402, and detailed description thereof is not repeated herein.

503: the first device transmits the tracking information to the second device, and based on the tracking information, the second device controls the second directional antenna to move until the second directional antenna faces toward the first directional antenna.

The tracking method in FIG. 5 differs from the tracking method in FIG. 2A and FIG. 3 in that, when the computing ability of the first device is relatively strong, the first device may calculate the tracking information of the first directional antenna and the tracking information of the second directional antenna of the second device. Thus, the computing ability of the first device may be fully utilized and the computing resource of the second device may be saved.

Figure 6:
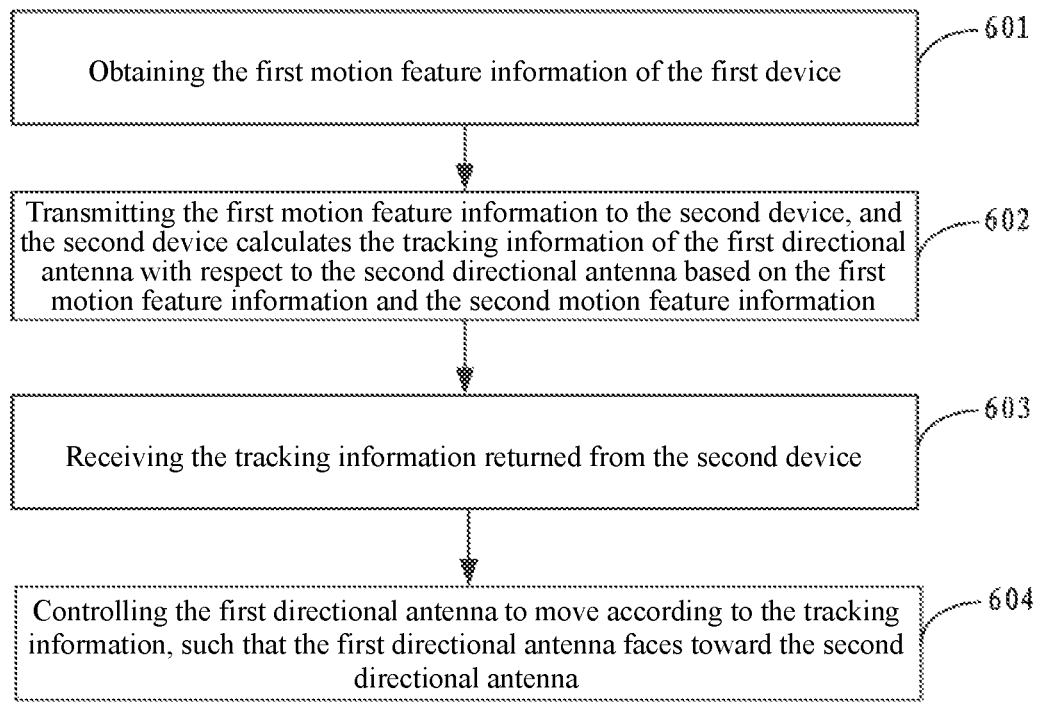
FIG. 6 is a flow chart of another example directional antenna tracking method according to some embodiments of the present disclosure.

FIG. 6 is a flow chart of another example directional antenna tracking method according to some embodiments of the present disclosure. The tracking method is applied to the first device, which uses the second device to calculate the tracking information of the first directional antenna.

601: the first motion feature information of the first device is obtained.

602: the first device transmits the first motion feature information to the second device, such that the second device calculates the tracking information of the first directional antenna with respect to the second directional antenna based on the first motion feature information and the second motion feature information of the second device.

In some embodiments, the first motion feature information obtained by the first device includes the coordinate information of the first device, the attitude information of the first device, and the attitude information of the first directional antenna. Correspondingly, the process that the second device calculates the tracking information of the first directional antenna with respect to the second directional antenna is similar to the process performed by the first device, and the description thereof is not repeated herein.

603: the first device receives the tracking information returned from the second device.

604: the first device uses the tracking information to control the first directional antenna to move until the first directional antenna faces toward the second directional antenna.

The tracking method in FIG. 6 differs from the tracking method in the above-described embodiments in that, when the computing ability of the first device is relatively weak and the computing ability of the second device is relatively strong, the second device may calculate the tracking information of the first directional antenna of the first device and may return the tracking information to the first device. Thus, the computing ability of the second device may be fully utilized and the computing resource of the first device may be saved.

Two typical application scenes of the directional antenna tracking methods in various embodiments are described below.

Figure 7A:
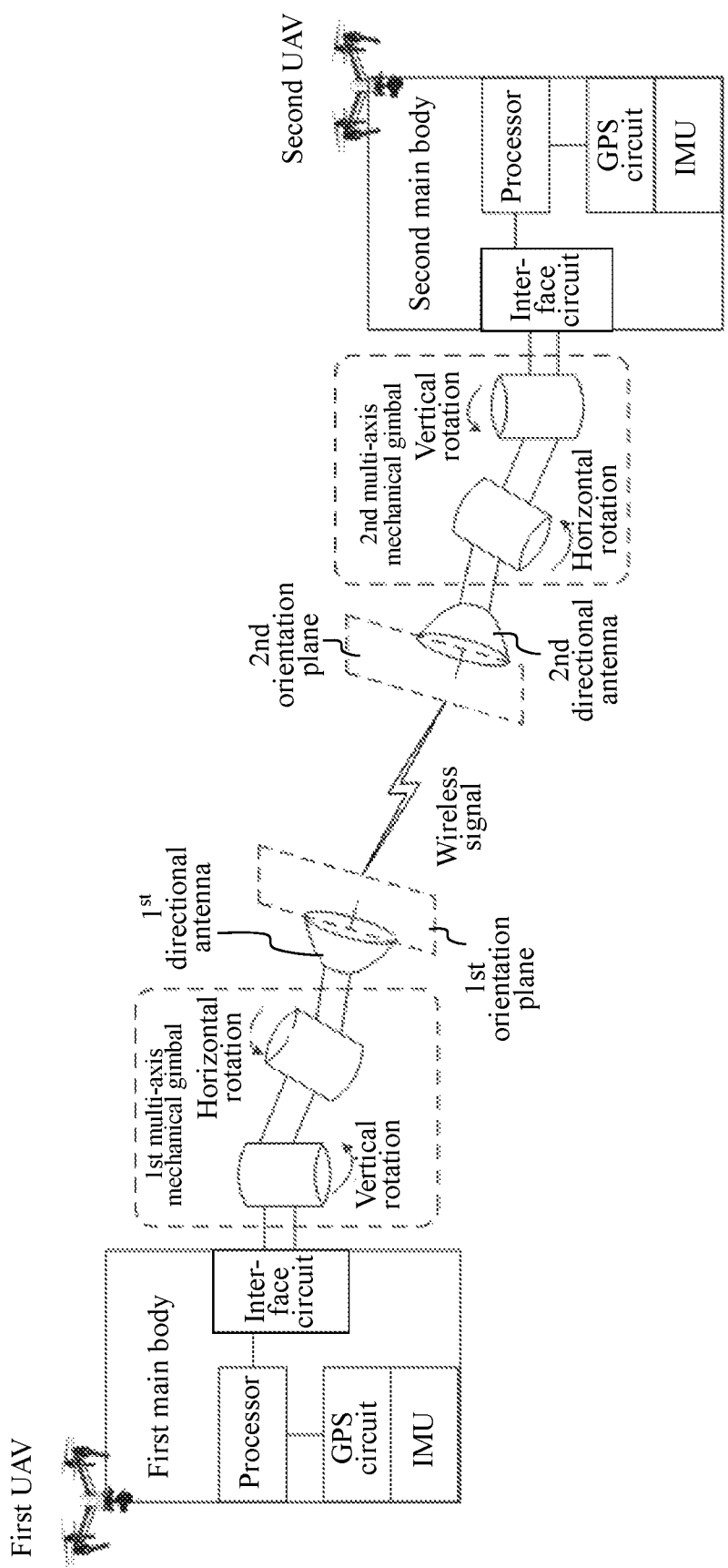
FIG. 7A is a schematic diagram of another example application scene of a point-to-point wireless communication system according to some embodiments of the present disclosure.

FIG. 7A is a schematic diagram of another example application scene of a point-to-point wireless communication system according to some embodiments of the present disclosure. As shown in FIG. 7A, the two parties of the point-to-point communication are two unmanned aerial vehicles (a first unmanned aerial vehicle and a second unmanned aerial vehicle). The two unmanned aerial vehicles may have an identical structure. The directional antenna of the unmanned aerial vehicle may be mounted at a multi-axis gimbal. The main body of the unmanned aerial vehicle can include an interface circuit, a processor connected to the processor, and a GPS circuit and an IMU both connected to the processor.

In the application scene, after the adjustment pitch angle and the adjustment yaw angle of the first directional antenna with respect to the second directional antenna are determined, for example, as described above, the first unmanned aerial vehicle controls a first multi-axis mechanical gimbal to rotate vertically and/or horizontally based on the adjustment angles. Thus, a first orientation plane of the first directional antenna faces toward a second orientation plane of the second directional antenna. Similarly, after the adjustment pitch angle and the adjustment yaw angle of the second directional antenna with respect to the first directional antenna are determined, for example, as described above, the second unmanned aerial vehicle controls a second multi-axis mechanical gimbal to rotate vertically and/or horizontally based on the adjustment angles. Thus, the second orientation plane of the second directional antenna faces toward the first orientation plane of the first directional antenna.

Figure 7B:
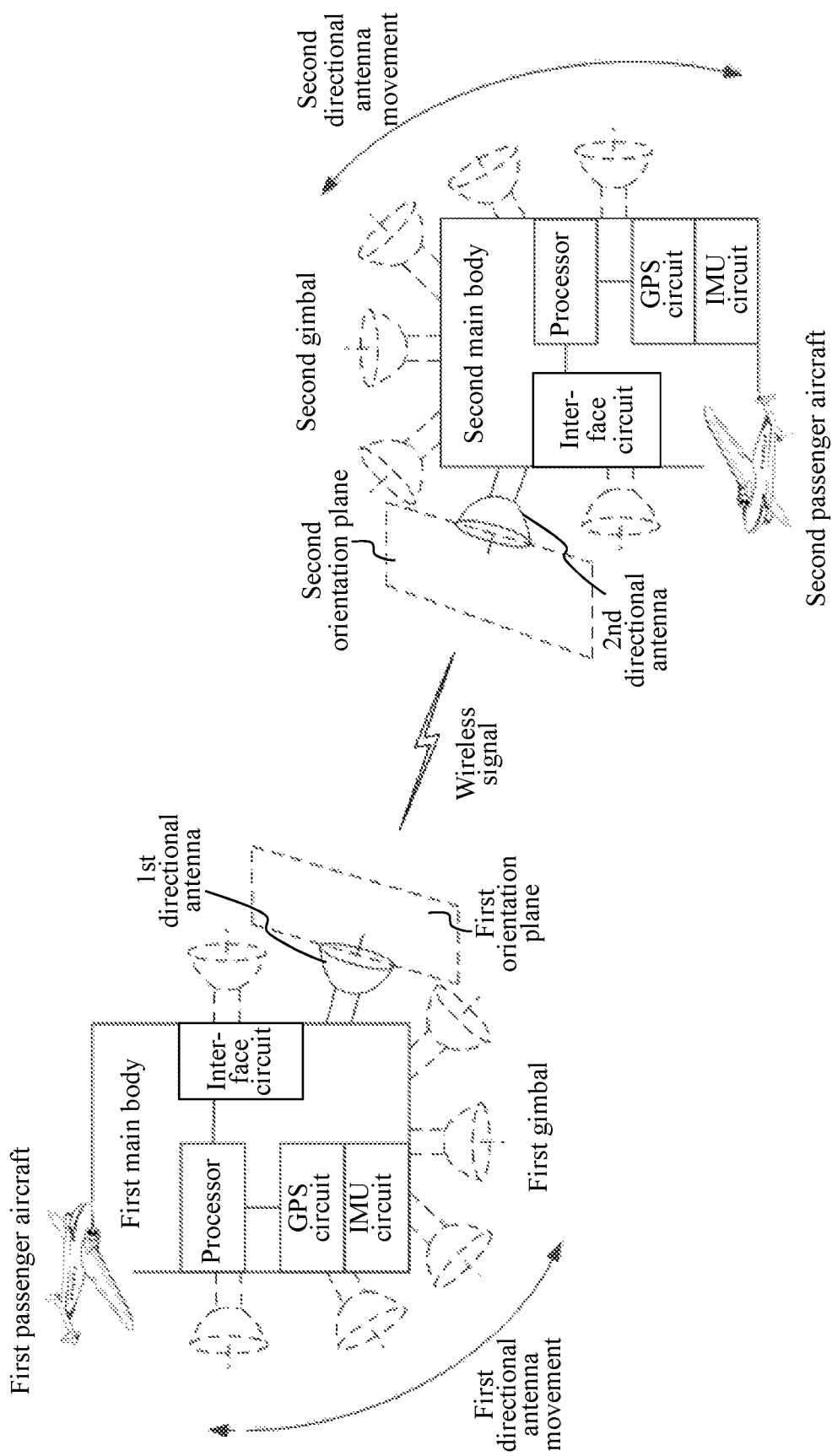
FIG. 7B is a schematic diagram of another example application scene of a point-to-point wireless communication system according to some embodiments of the present disclosure.

FIG. 7B is a schematic diagram of another example application scene of a point-to-point wireless communication system according to some embodiments of the present disclosure. As shown in FIG. 7B, the two parties of the point-to-point communication are two passenger aircrafts (a first passenger craft and a second passenger craft). The two passenger aircrafts may have an identical structure. Unlike the multi-axis mechanical gimbal in the application scene in FIG. 7A, the gimbal in FIG. 7B is a gimbal capable of moving in a spatial range. For example, the gimbal may rotate in a horizontal reference plane, and may pitch in a vertical reference plane.

In the application scene, after the adjustment pitch angle and the adjustment yaw angle of the first directional antenna with respect to the second directional antenna are determined, for example, as described above, the first passenger aircraft controls a first gimbal to move based on the adjustment angles. Thus, a first orientation plane of the first directional antenna faces toward a second orientation plane of the second directional antenna. Similarly, after the adjustment pitch angle and the adjustment yaw angle of the second directional antenna with respect to the first directional antenna are determined, for example, as described above, the second passenger aircraft controls a second gimbal to move based on the adjustment angles. Thus, the second orientation plane of the second directional antenna faces toward the first orientation plane of the first directional antenna.

In addition, in another application scene of the present disclosure, the two parties of the point-to-point communication are two unmanned aerial vehicles. Unlike the directional antennas in FIG. 7A and FIG. 7B, the directional antennas on the unmanned aerial vehicles in this application scene are antenna arrays. That is, a plurality of antennas are configured in a certain direction range. The main body of the unmanned aerial vehicle can include an interface circuit, a processor connected to the processor, and a GPS circuit and an IMU both connected to the processor.

The first unmanned aerial vehicle includes a first antenna array. The second unmanned aerial vehicle includes a second antenna array. In the application scene, after the adjustment pitch angle and the adjustment yaw angle of the first directional antenna with respect to the second directional antenna are determined, for example, as described above, the first unmanned aerial vehicle selects a first target antenna in the first antenna array based on the adjustment angles. Similarly, after the adjustment pitch angle and the adjustment yaw angle of the second directional antenna with respect to the first directional antenna are determined, for example, as described above, the second unmanned aerial vehicle selects a second target antenna in the second antenna array based on the adjustment angles. The first orientation plane of the first target antenna is parallel to the second orientation plane of the second target antenna, and a line connection between the coordinates of the first target antenna and the second target antenna is perpendicular to the two orientation planes.

Corresponding to the embodiments of the directional antenna tracking method, the present disclosure also provides embodiments of a directional antenna tracking apparatus and a communication device.

Figure 8:
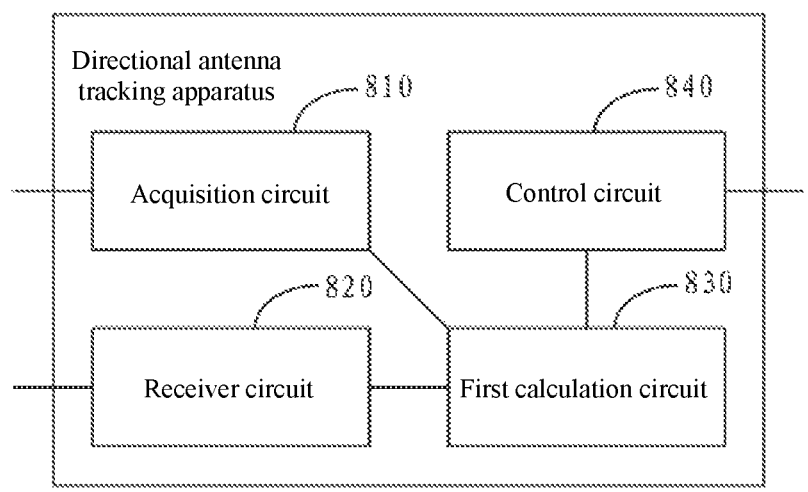
FIG. 8 is a block diagram of an example directional antenna tracking apparatus according to some embodiments of the present disclosure.

FIG. 8 is a block diagram of an example directional antenna tracking apparatus according to some embodiments of the present disclosure. The apparatus is applied to the first device. As shown in FIG. 8, the apparatus includes an acquisition circuit 810 configured to acquire the first motion feature information of the first device, a receiver circuit configured to receive the second motion feature information transmitted from the second device, a first calculation circuit 830 configured to calculate the tracking information of the first directional antenna with respect to the second directional antenna based on first motion feature information and the second motion feature information, a control circuit 840 configured to control the first directional antenna based on the tracking information, such that the first directional antenna faces toward the second directional antenna.

In some embodiments, the first device includes a first motion feature information collection circuit. In the movement process of the first device, the acquisition circuit 810 acquires the first motion feature information collected by the first motion feature information collection circuit in real-time. The first motion feature information collection circuit may include at least one of an inertial measurement unit (IMU), a compass circuit, a global positioning (GPS) circuit, a base station based positioning circuit, or a vision and map based positioning circuit.

In some embodiments, the apparatus also includes an establishment circuit (not shown in FIG. 8) configured to establish a point-to-point wireless communication link with the second device. The wireless communication link includes a direct wireless communication link or an indirection wireless communication link having a third party relaying wireless signals between the first device and the second device. The receiver circuit 820 is configured to receive the second motion feature information transmitted from the second device through the wireless communication link.

In some embodiments, the first calculation circuit 830 includes an information detection sub-circuit configured to detect the changes of the first motion feature information and the second motion feature information relative to those in the preceding time cycle, and an information calculation sub-circuit configured to calculate the tracking information of the first directional antenna with respect to the second directional antenna based on the changes of the first motion feature information and the second motion feature information.

In some embodiments, the first motion feature information includes the coordinate information of the first device, the attitude information of the first device, and the attitude information of the first directional antenna. The second motion feature information includes the coordinate information of the second device. The first calculation circuit 830 may include a first location information calculation sub-circuit, a first target angle calculation sub-circuit, and a first adjustment angle determination sub-circuit.

The first location information calculation sub-circuit is configured to calculate the location information in the vertical direction and the location information in the horizontal direction for the first device and the second device, based on the coordinate information of the first device and the coordinate information of the second device. The first target angle calculation sub-circuit is configured to call a pre-configured trigonometric function to calculate a target pitch angle in the vertical direction and a target yaw angle in the horizontal direction, of the first directional antenna with respect to the second directional antenna, based on the location information in the vertical direction and the location information in the horizontal direction. The first adjustment angle determination sub-circuit is configured to determine an adjustment pitch angle of the first directional antenna with respect to the second directional antenna and an adjustment yaw angle of the first directional antenna with respect to the second directional antenna based on the attitude information of the first device and/or the attitude information of the first directional antenna, the target pitch angle and the target yaw angle.

In some embodiments, the first directional antenna is mounted at a multi-axis mechanical gimbal. The control circuit 840 is configured to control a vertical adjustment servo mechanism of the multi-axis mechanical gimbal to drive the first directional antenna to move according to the adjustment pitch angle and to control a horizontal adjustment servo mechanism of the multi-axis mechanical gimbal to drive the first directional antenna to move according to the adjustment yaw angle, such that the first directional antenna faces toward the second directional antenna.

In some embodiments, the first directional antenna is an antenna array, and the second directional antenna is an antenna array. The control circuit 840 is configured to select a first target antenna from the antenna array of the first directional antenna and a second target antenna from the antenna array of the second directional antenna based on the adjustment pitch angle and the adjustment yaw angle, such that the first target antenna faces toward the second target antenna.

Figure 9:
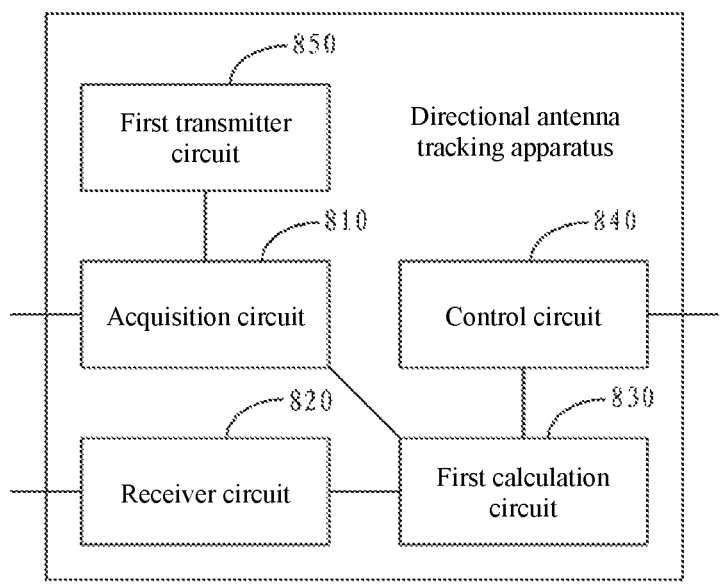
FIG. 9 is a block diagram of another example directional antenna tracking apparatus according to some embodiments of the present disclosure.

FIG. 9 is a block diagram of another example directional antenna tracking apparatus according to some embodiments of the present disclosure. The apparatus is applied to the first device. In addition to the apparatus shown in FIG. 8, the apparatus further includes a first transmitter circuit 850.

The first transmitter circuit 850 is configured to transmit the first motion feature information to the second device, such that the second device calculates the tracking information of the second directional antenna with respect to the first directional antenna based on the first motion feature information and the second motion feature information. The first motion feature information may include the coordinate information of the first device.

Figure 10:
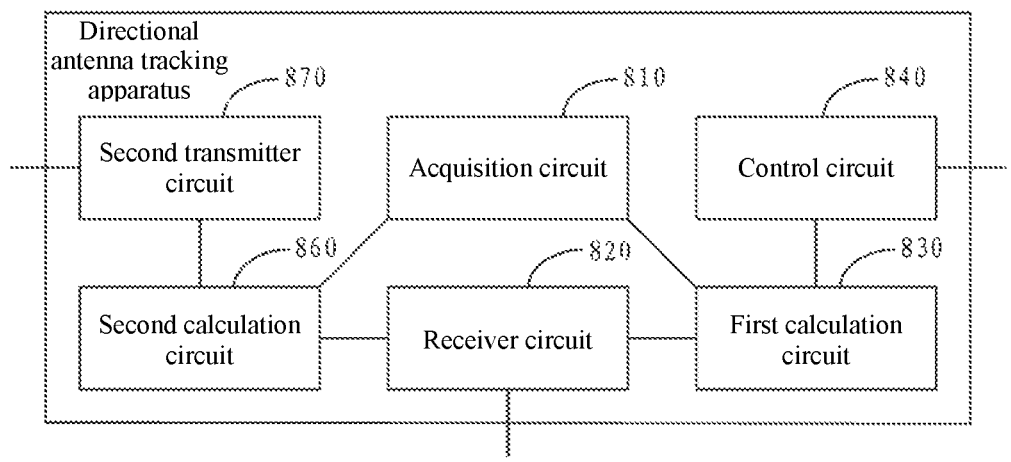
FIG. 10 is a block diagram of another example directional antenna tracking apparatus according to some embodiments of the present disclosure.

FIG. 10 is a block diagram of another example directional antenna tracking apparatus according to some embodiments of the present disclosure. The apparatus is applied to the first device. Different from the apparatus shown in FIG. 8, the apparatus shown in FIG. 10 further includes a second calculation circuit 860 and a second transmitter circuit 870. The second calculation circuit 860 is configured to calculate the tracking information of the second directional antenna with respect to the first directional antenna based on the second motion feature information and the first motion feature information. The second transmitter circuit 870 is configured to transmit the tracking information of the second directional antenna with respect to the first directional antenna to the second device.

In some embodiments, the second motion feature information includes the coordinate information of the second device, the attitude information of the second device, and the attitude information of the second directional antenna. The first motion feature information includes the coordinate information of the first device.

The second calculation circuit 860 may include a second location information calculation sub-circuit, a second target angle calculation sub-circuit, and a second adjustment calculation sub-circuit. The second location information calculation sub-circuit is configured to calculate the location information in the vertical direction and the location information in the horizontal direction, of the second device and the first device, based on the coordinate information of the second device and the coordinate information of the first device. The second target angle calculation sub-circuit is configured to call a pre-configured trigonometric function to calculate the target pitch angle in the vertical direction and the target yaw angle in the horizontal direction, of the second directional antenna with respect to the first directional antenna, based on the location information in the vertical direction and the location information in the horizontal direction. The second adjustment angle calculation sub-circuit is configured to determine the adjustment pitch angle of the second directional antenna with respect to the first directional antenna and the adjustment yaw angle of the second directional antenna with respect to the first directional antenna, based on the attitude information of the second device and/or the attitude information of the second directional antenna, the target pitch angle and the target yaw angle.

Figure 11:
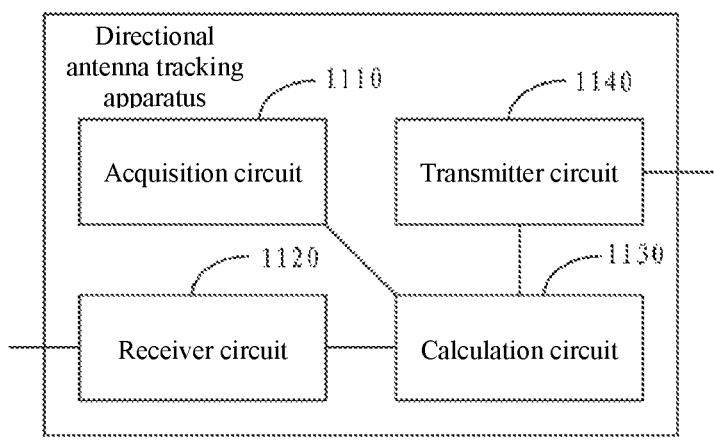
FIG. 11 is a block diagram of another example directional antenna tracking apparatus according to some embodiments of the present disclosure.

FIG. 11 is a block diagram of another example directional antenna tracking apparatus according to some embodiments of the present disclosure. The apparatus is applied to the first device. The apparatus includes an acquisition circuit 1110, a receiver circuit 1120, a calculation circuit 1130, and a transmitter circuit 1140.

The acquisition circuit 1110 is configured to acquire the first motion feature information of the first device. The receiver circuit 1120 is configured to receive the second motion feature information from the second device. The calculation circuit 1130 is configured to calculate the tracking information of the second directional antenna with respect to the first directional antenna based on the first motion feature information and the second motion feature information. The transmitter circuit 1140 is configured to transmit the tracking information to the second device, such that the second device controls the second directional antenna to move according to the tracking information until the second directional antenna faces toward the first directional antenna.

In some embodiments, the first device includes a first motion feature information collection circuit. The acquisition circuit 1110 is configured to acquire the first motion feature information collected by the first motion feature information collection circuit in real-time in the movement process of the first device. The first motion feature information collection circuit includes at least one of an inertial measurement unit (IMU), a compass circuit, a global positioning (GPS) circuit, a base station based positioning circuit, or a vision and map based positioning circuit.

In some embodiments, the apparatus also includes an establishment circuit (not shown in FIG. 11) configured to establish a point-to-point wireless communication link with the second device. The wireless communication link includes a direct wireless communication link or an indirection wireless communication link having a third party relaying wireless signals between the first device and the second device. The receiver circuit 1120 is configured to receive the second motion feature information transmitted from the second device through the wireless communication link. The transmitter circuit 1140 is configured to transmit the tracking information to the second device through the wireless communication link.

In some embodiments, the calculation circuit 1130 includes an information detection sub-circuit configured to detect the changes of the first motion feature information and the second motion feature information relative to those in the preceding time cycle, and an information calculation sub-circuit configured to calculate the tracking information of the second directional antenna with respect to the first directional antenna based on the changes of the first motion feature information and the second motion feature information.

In some embodiments, the first motion feature information includes the coordinate information of the first device. The second motion feature information includes the coordinate information of the second device, the attitude information of the second device, and the attitude information of the second directional antenna. The calculation circuit 1130 may include a location information calculation sub-circuit, a target angle calculation sub-circuit, and an adjustment angle determination sub-circuit.

The location information calculation sub-circuit is configured to calculate the location information in the vertical direction and the location information in the horizontal direction for the first device and the second device, based on the coordinate information of the first device and the coordinate information of the second device. The target angle calculation sub-circuit is configured to call a pre-configured trigonometric function to calculate a target pitch angle in the vertical direction and a target yaw angle in the horizontal direction, of the second directional antenna with respect to the first directional antenna, based on the location information in the vertical direction and the location information in the horizontal direction. The adjustment angle determination sub-circuit is configured to determine an adjustment pitch angle of the second directional antenna with respect to the first directional antenna and an adjustment yaw angle of the second directional antenna with respect to the first directional antenna based on the attitude information of the second device and/or the attitude information of the second directional antenna, the target pitch angle and the target yaw angle.

Figure 12:
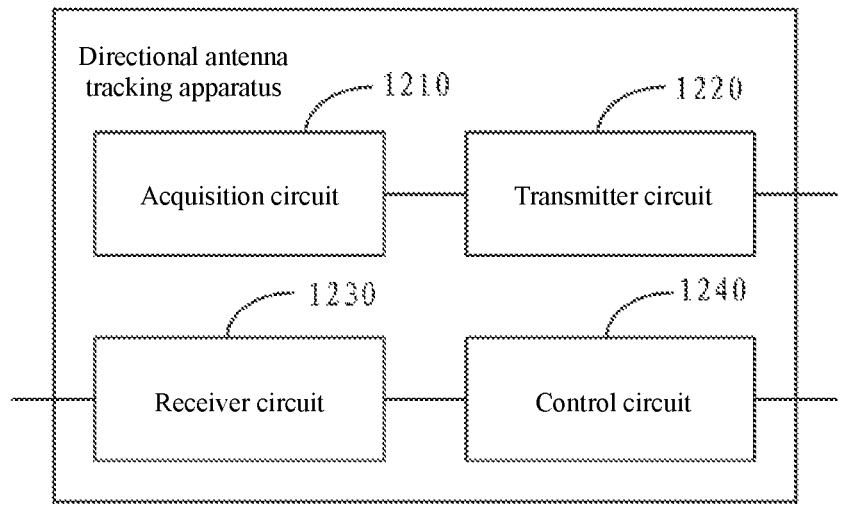
FIG. 12 is a block diagram of another example directional antenna tracking apparatus according to some embodiments of the present disclosure.

FIG. 12 is a block diagram of another example directional antenna tracking apparatus according to some embodiments of the present disclosure. The apparatus is applied to the first device. As shown in FIG. 12, the apparatus includes an acquisition circuit 1210, a transmitter circuit 1220, a receiver circuit 1230, and a control circuit 1240.

The acquisition circuit 1210 is configured to acquire the first motion feature information of the first device. The transmitter circuit 1220 is configured to transmit the first motion feature information to the second device, such that the second deice calculates the tracking information of the first directional antenna with respect to the second directional antenna based on the first motion feature information and the second motion feature information of the second device. The receiver circuit 1230 is configured to receive the tracking information returned from the second device. The control circuit 1240 is configured to control the first directional antenna to move according to the tracking information, such that the first directional antenna faces toward the second directional antenna.

In some embodiments, the first device includes a first motion feature information collection circuit. The acquisition circuit 1210 is configured to acquire the first motion feature information collected by the first motion feature information collection circuit in real-time in the movement process of the first device. The first motion feature information collection circuit includes at least one of an inertial measurement unit (IMU), a compass circuit, a global positioning (GPS) circuit, a base station based positioning circuit, or a vision and map based positioning circuit.

In some embodiments, the apparatus also includes an establishment circuit (not shown in FIG. 12) configured to establish a point-to-point wireless communication link with the second device. The wireless communication link includes a direct wireless communication link or an indirection wireless communication link having a third party relaying wireless signals between the first device and the second device. The transmitter circuit 1220 is configured to transmit the first motion feature information to the second device through the wireless communication link. The receiver circuit 1130 is configured to receive the tracking information returned from the second device through the wireless communication link.

In some embodiments, the first motion feature information includes the coordinate information of the first device, the attitude information of the first device, and the attitude information of the first directional antenna. The second motion feature information includes the coordinate information of the second device. The tracking information of the first directional antenna with respect to the second directional antenna includes the adjustment pitch angle of the first directional antenna with respect to the second directional antenna and the adjustment yaw angle of the first directional antenna with respect to the second directional antenna.

In some embodiments, the first directional antenna is mounted at a multi-axis mechanical gimbal. The control circuit 1240 is configured to control a vertical adjustment servo mechanism of the multi-axis mechanical gimbal to drive the first directional antenna to move according to the adjustment pitch angle and to control a horizontal adjustment servo mechanism of the multi-axis mechanical gimbal to drive the first directional antenna to move according to the adjustment yaw angle, such that the first directional antenna faces toward the second directional antenna.

In some embodiments, the first directional antenna is an antenna array, and the second directional antenna is an antenna array. The control circuit 1240 is configured to select a first target antenna from the antenna array of the first directional antenna and a second target antenna from the antenna array of the second directional antenna based on the adjustment pitch angle and the adjustment yaw angle, such that the first target antenna faces toward the second target antenna.

Figure 13:
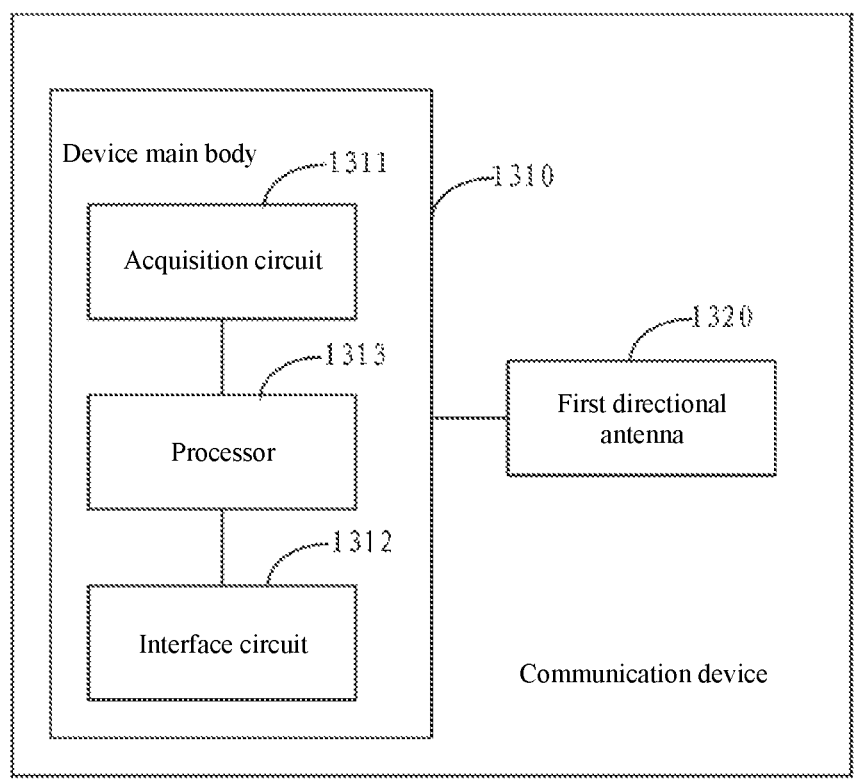
FIG. 13 is a block diagram of an example communication device according to some embodiments of the present disclosure.

FIG. 13 is a block diagram of an example communication device according to some embodiments of the present disclosure. The communication device is the first device in the point-to-point communication system. As shown in FIG. 13, the communication device includes a device main body 1310 and a first directional antenna 1320. The device main body 1310 includes a collection circuit 1311, an interface circuit 1312, and a processor 1313.

In some embodiments, the collection circuit 1311 is configured to collect the first motion feature information of the first device. The interface circuit 1312 is configured to receive the second motion feature information transmitted from the second device. The processor 1313 is configured to calculate the tracking information of the first directional antenna with respect to the second directional antenna based on the first motion feature information and the second motion feature information, and to control the first directional antenna according to the tracking information, such that the first directional antenna faces toward the second directional antenna.

In some embodiments, the collection circuit 1311 may include at least one of an inertial measurement unit (IMU), a compass circuit, a global positioning (GPS) circuit, a base station based positioning circuit, or a vision and map based positioning circuit.

In some embodiments, the interface circuit 1312 is also configured to establish the point-to-point wireless communication link with the second device, and to receive the second motion feature information transmitted from the second device through the wireless communication link. The wireless communication link includes a direct wireless communication link or an indirection wireless communication link having a third party relaying wireless signals between the first device and the second device.

In some embodiments, the processor 1313 is configured to detect the changes of the first motion feature information and the second motion feature information relative to those in the preceding time cycle, and to calculate the tracking information of the first directional antenna with respect to the second directional antenna based on the changes of the first motion feature information and the second motion feature information.

In some embodiments, the first motion feature information includes the coordinate information of the first device, the attitude information of the first device, and the attitude information of the first directional antenna. The second motion feature information includes the coordinate information of the second device.

The processor 1313 is configured to calculate the location information in the vertical direction and the location information in the horizontal direction for the first device and the second device, based on the coordinate information of the first device and the coordinate information of the second device. The processor 1313 is configured to call a preconfigured trigonometric function to calculate a target pitch angle in the vertical direction and a target yaw angle in the horizontal direction, of the first directional antenna with respect to the second directional antenna, based on the location information in the vertical direction and the location information in the horizontal direction. The processor 1313 is configured to determine an adjustment pitch angle of the first directional antenna with respect to the second directional antenna and an adjustment yaw angle of the first directional antenna with respect to the second directional antenna based on the attitude information of the first device and/or the attitude information of the first directional antenna, the target pitch angle and the target yaw angle.

In some embodiments, the first directional antenna is mounted at a multi-axis mechanical gimbal. The processor 1313 is configured to control a vertical adjustment servo mechanism of the multi-axis mechanical gimbal to drive the first directional antenna to move according to the adjustment pitch angle and to control a horizontal adjustment servo mechanism of the multi-axis mechanical gimbal to drive the first directional antenna to move according to the adjustment yaw angle, such that the first directional antenna faces toward the second directional antenna.

In some embodiments, the first directional antenna is an antenna array, and the second directional antenna is an antenna array. The processor 1313 is configured to select a first target antenna from the antenna array of the first directional antenna and a second target antenna from the antenna array of the second directional antenna based on the adjustment pitch angle and the adjustment yaw angle, such that the first target antenna faces toward the second target antenna.

In some embodiments, the interface circuit 1312 is configured to transmit the first motion feature information to the second device, such that the second device calculates the tracking information of the second directional antenna with respect to the first directional antenna based on the first motion feature information and the second motion feature information. The first motion feature information may include the coordinate information of the first device.

In some embodiments, the processor 1313 is configured to calculate the tracking information of the second directional antenna with respect to the first directional antenna based on the second motion feature information and the first motion feature information, and to transmit the tracking information of the second directional antenna with respect to the first directional antenna to the second device.

The second motion feature information includes the coordinate information of the second device, the attitude information of the second device, and the attitude information of the second directional antenna. The first motion feature information includes the coordinate information of the first device.

The processor 1313 is configured to calculate the location information in the vertical direction and the location information in the horizontal direction for the first device and the second device, based on the coordinate information of the first device and the coordinate information of the second device. The processor 1313 is configured to call a preconfigured trigonometric function to calculate a target pitch angle in the vertical direction and a target yaw angle in the horizontal direction, of the second directional antenna with respect to the first directional antenna, based on the location information in the vertical direction and the location information in the horizontal direction. The processor 1313 is configured to determine an adjustment pitch angle of the second directional antenna with respect to the first directional antenna and an adjustment yaw angle of the second directional antenna with respect to the first directional antenna based on the attitude information of the second device and/or the attitude information of the second directional antenna, the target pitch angle and the target yaw angle.

In some embodiments, the collection circuit 1311 is configured to collect the first motion feature information of the first device. The interface circuit 1312 is configured to receive the second motion feature information transmitted from the second device. The processor 1313 is configured to calculate the tracking information of the second directional antenna with respect to the first directional antenna based on the first motion feature information and the second motion feature information. The interface circuit 1312 is also configured to transmit the tracking information to the second device, such that the second device controls the second directional antenna to move according to the tracking information until the second directional antenna faces toward the first directional antenna.

In some embodiments, the collection circuit 1311 may include at least one of an inertial measurement unit (IMU), a compass circuit, a global positioning (GPS) circuit, a base station based positioning circuit, or a vision and map based positioning circuit.

In some embodiments, the interface circuit 1312 is also configured to establish the point-to-point wireless communication link with the second device, receive the second motion feature information transmitted from the second device through the wireless communication link, and transmit the tracking information to the second device through the wireless communication link. The wireless communication link includes a direct wireless communication link or an indirection wireless communication link having a third party relaying wireless signals between the first device and the second device.

In some embodiments, the processor 1313 is configured to detect the changes of the first motion feature information and the second motion feature information relative to those in the preceding time cycle, and to calculate the tracking information of the second directional antenna with respect to the first directional antenna based on the changes of the first motion feature information and the second motion feature information.

In some embodiments, the first motion feature information includes the coordinate information of the first device. The second motion feature information includes the coordinate information of the second device, the attitude information of the second device, and the attitude information of the second directional antenna.

The processor 1313 is configured to calculate the location information in the vertical direction and the location information in the horizontal direction for the first device and the second device, based on the coordinate information of the first device and the coordinate information of the second device. The processor 1313 is configured to call a preconfigured trigonometric function to calculate a target pitch angle in the vertical direction and a target yaw angle in the horizontal direction, of the second directional antenna with respect to the first directional antenna, based on the location information in the vertical direction and the location information in the horizontal direction. The processor 1313 is configured to determine an adjustment pitch angle of the second directional antenna with respect to the first directional antenna and an adjustment yaw angle of the second directional antenna with respect to the first directional antenna based on the attitude information of the second device and/or the attitude information of the second directional antenna, the target pitch angle and the target yaw angle.

In some embodiments, the collection circuit 1311 is configured to collect the first motion feature information of the first device. The interface circuit 1312 is configured to transmit the first motion feature information to the second device and to receive the tracking information returned from the second device. The tracking information is the tracking information of the first directional antenna with respect to the second directional antenna that the second device calculates based on the first motion feature information and the second motion feature information of the second device. The processor 1313 is configured to control the first directional antenna to move according to the tracking information, such that the first directional antenna faces toward the second directional antenna.

In some embodiments, the collection circuit 1311 may include at least one of an inertial measurement unit (IMU), a compass circuit, a global positioning (GPS) circuit, a base station based positioning circuit, or a vision and map based positioning circuit.

In some embodiments, the interface circuit 1312 is also configured to establish the point-to-point wireless communication link with the second device, transmit the first motion feature information to the second device through the wireless communication link, and receive the tracking information returned from the second device through the wireless communication link. The wireless communication link includes a direct wireless communication link or an indirection wireless communication link having a third party relaying wireless signals between the first device and the second device.

In some embodiments, the first motion feature information includes the coordinate information of the first device, the attitude information of the first device, and the attitude information of the first directional antenna. The second motion feature information includes the coordinate information of the second device. The tracking information of the first directional antenna with respect to the second directional antenna includes the adjustment pitch angle of the first directional antenna with respect to the second directional antenna and the adjustment yaw angle of the first directional antenna with respect to the second directional antenna.

In some embodiments, the first directional antenna is mounted at a multi-axis mechanical gimbal. The processor 1313 is configured to control a vertical adjustment servo mechanism of the multi-axis mechanical gimbal to drive the first directional antenna to move according to the adjustment pitch angle and to control a horizontal adjustment servo mechanism of the multi-axis mechanical gimbal to drive the first directional antenna to move according to the adjustment yaw angle, such that the first directional antenna faces toward the second directional antenna.

In some embodiments, the first directional antenna is an antenna array, and the second directional antenna is an antenna array. The processor 1313 is configured to select a first target antenna from the antenna array of the first directional antenna and a second target antenna from the antenna array of the second directional antenna based on the adjustment pitch angle and the adjustment yaw angle, such that the first target antenna faces toward the second target antenna.

In various embodiments, the system, apparatus, circuit, or sub-circuit may be implemented by a computer chip or hardware or may be implemented by a product having a certain function. For the convenience of description, the apparatus may be divided into units according to functions and each of the units may be described separately. The unit functions may be implemented in one or more software and/or hardware modules. Those having ordinary skill in the art should understand that the embodiments of the present disclosure may be provided as methods, systems, or computer program products. Thus, the present disclosure may be implemented entirely in hardware, entirely in software, or in combination of hardware and software. Moreover, the present disclosure may be implemented by one or more computer program products in the form of computer readable storage media (including, but not limited to, magnetic disk memory, CD-ROM, optical disk memory, etc.) containing computer executable program codes. The preset disclosure also provides a device including processor and a storage medium storing computer executable program codes that, when executed by the processor, cause the processor to perform a method consistent with the disclosure, such as one of the above-described example methods.

The embodiments of the present disclosure are described in a progressive manner. The same or similar portion among the embodiments can be referred to each other. Each embodiment will be described with the focus on the differences as compared to other embodiments. Due to similarity to the method embodiments, the system embodiments are described briefly. The related portions may refer to the corresponding description of the method embodiments.

It should be noted that, in the specification, relational terms such as first and second are only used to distinguish one entity or operation from another entity or operation, and do not necessarily require or imply actual relationship or order existed among the entities or operations. The terms "comprise," "include," or other variations thereof are intended to cover a non-exclusive inclusion such that a process, method, article, or apparatus not only includes the listed elements, but also includes other elements that are not explicitly listed or other elements inherent to the process, method, article, or apparatus. Without further limitation, an element defined by a sentence "includes one . . . " does not exclude additional similar elements in the process, method, article, or apparatus.

The above description is only some embodiments of the present disclosure, and is not intended to limit the scope of the present disclosure. Those having ordinary skill in the art may appreciate various modifications and changes. Any modifications, equivalent substitutions, and improvements made within the spirit and principle of the present disclosure should be included in the scope of the present disclosure.

What is claimed is:

1. A directional antenna tracking method comprising:
   obtaining first motion feature information of a first device, the first motion feature information including attitude information of the first device obtained by a first inertial measurement unit (IMU) and attitude information of a first directional antenna of the first device obtained by a second IMU;
   receiving second motion feature information transmitted from a second device;
   calculating, based on the first motion feature information and the second motion feature information, tracking information of the first directional antenna of the first device with respect to a second directional antenna of the second device; and
   controlling the first directional antenna to move according to the tracking information to face toward the second directional antenna.

2. The method of claim 1, wherein obtaining the first motion feature information of the first device includes obtaining the first motion feature information collected by a motion feature information collection circuit of the first device in real-time during movement of the first device, the motion feature information collection circuit including the first IMU and the second IMU.

3. The method of claim 2, wherein the motion feature information collection circuit further includes at least one of, a compass circuit, a global positioning (GPS) circuit, a base station based positioning circuit, or a vision and map based positioning circuit.

4. The method of claim 1, further comprising:
   establishing a point-to-point wireless communication link between the first device and the second device, the wireless communication link including a direct wireless communication link or an indirection wireless communication link;
   wherein receiving the second motion feature information transmitted from the second device includes receiving second motion feature information transmitted from the second device through the wireless communication link.

5. The method of claim 1, wherein calculating the tracking information includes:
   detecting changes of the first motion feature information and the second motion feature information between a current time cycle and a preceding time cycle; and
   calculating the tracking information based on the changes.

6. The method of claim 1, wherein:
   the first motion feature information further includes coordinate information of the first device;
   the second motion feature information includes coordinate information of the second device; and
   calculating the tracking information includes:
      calculating, based on the coordinate information of the first device and the coordinate information of the second device, location information of the first device and location information of the second device;
      calling a pre-configured trigonometric function to calculate a target pitch angle of the first directional antenna with respect to the second directional antenna and a target yaw angle of the first directional antenna with respect to the second directional antenna based on the location information of the first device and the location information of the second device; and
      determining, based on the target pitch angle, the target yaw angle, and at least one of the attitude information of the first device or the attitude information of the first directional antenna, an adjustment pitch angle of the first directional antenna with respect to the second directional antenna and an adjustment yaw angle of the first directional antenna with respect to the second directional antenna.

7. The method of claim 6, wherein controlling the first directional antenna to move according to the tracking information includes at least one of:
   controlling a vertical adjustment servo mechanism of a multi-axis mechanical gimbal carrying the first directional antenna to drive the first directional antenna to move according to the adjustment pitch angle; or
   controlling a horizontal adjustment servo mechanism of the multi-axis mechanical gimbal to drive the first antenna to move according to the adjustment yaw angle.

8. The method of claim 6, wherein:
   the first directional antenna includes a first antenna array and the second directional antenna includes a second antenna array; and
   controlling the first directional antenna to move according to the tracking information includes selecting a first target antenna from the first antenna array and a second target antenna from the second antenna array based on the adjustment pitch angle and the adjustment yaw angle, such that the first target antenna faces toward the second target antenna.

9. The method of claim 1, further comprising:
   transmitting the first motion feature information to the second device.

10. The method of claim 9, wherein the first motion feature information further includes coordinate information of the first device.

11. A communication device comprising:
   a first directional antenna; and
   a device main body including:
      a collection circuit configured to collect first motion feature information of the communication device, the collection circuit including a first inertial measurement unit (IMU) configured to obtain attitude information of the first directional antenna and a second IMU configured to obtain attitude information of the communication device, and the first motion feature information including the attitude information of the first directional antenna and the attitude information of the communication device;

an interface configured to receive second motion feature information from a remote device; and a processor configured to:
calculate tracking information of the first directional antenna with respect to a second directional antenna of the remote device based on the first motion feature information and the second motion feature information; and control the first directional antenna to move according to the tracking information to face toward the second directional antenna.

12. The device of claim 11, wherein the collection circuit further includes at least one of a compass circuit, a global positioning (GPS) circuit, a base station based positioning circuit, or a vision and map based positioning circuit.

13. The device of claim 11, wherein the interface is further configured to:
establish a point-to-point wireless communication link with the remote device, the wireless communication link including a direct wireless communication link or an indirection wireless communication link; and
receive the second motion feature information transmitted from the remote device through the wireless communication link.

14. The device of claim 11, wherein the processor is further configured to
detect changes of the first motion feature information and the second motion feature information between a current time cycle and a preceding time cycle; and
calculate the tracking information based on the changes.

15. The device of claim 11, wherein:
the first motion feature information further includes coordinate information of the communication device;
the second motion feature information includes coordinate information of the remote device; and
the processor is further configured to:
calculate, based on the coordinate information of the communication device and the coordinate information of the remote device, location information of the communication device and location information of the remote device;
call a pre-configured trigonometric function to calculate a target pitch angle of the first directional antenna with respect to the second directional antenna and a target yaw angle of the first directional antenna with respect to the second directional antenna based on the location information of the communication device and the location information of the remote device; and
determine, based on the target pitch angle, the target yaw angle, and at least one of the attitude information of the communication device or the attitude information of the first directional antenna, an adjustment pitch angle of the first directional antenna with respect to the second directional antenna and an adjustment yaw angle of the first directional antenna with respect to the second directional antenna.

16. The device of claim 15, further comprising:
a multi-axis mechanical gimbal carrying the first directional antenna;
the processor is further configured to:
control a vertical adjustment servo mechanism of the multi-axis mechanical gimbal to drive the first directional antenna to move according to the adjustment pitch angle; or
control a horizontal adjustment servo mechanism of the multi-axis mechanical gimbal to drive the first antenna to move according to the adjustment yaw angle.

17. The device of claim 15, wherein:
the first directional antenna includes a first antenna array and the second directional antenna includes a second antenna array; and
the processor is further configured to select a first target antenna from the first antenna array and a second target antenna from the second antenna array based on the adjustment pitch angle and the adjustment yaw angle, such that the first target antenna faces toward the second target antenna.

18. The device of claim 11, wherein the interface is further configured to transmit the first motion feature information to the remote device.

19. The device of claim 11, wherein the processor is configured to:
calculate tracking information of the second directional antenna with respect to the first directional antenna based on the second motion feature information and the first motion feature information; and
transmit the tracking information of the second directional antenna with respect to the first directional antenna to the remote device.

20. The device of claim 11, further comprising:
a multi-axis mechanical gimbal carrying the first directional antenna and being configured to rotate around a plurality of axes;
wherein:
the device main body is configured to be movable relative to ground to change a location of the device main body;
the multi-axis mechanical gimbal is connected between the first directional antenna and the device main body;
the remote device is movable relative to the ground to change a location of the remote device; and
the processor is further configured to control the multi-axis mechanical gimbal to drive the first directional antenna to rotate according to the tracking information.

* * * * *